J. H. Crandell.
Bee Hive.
N° 89,129. Patented Apr. 20, 1869.
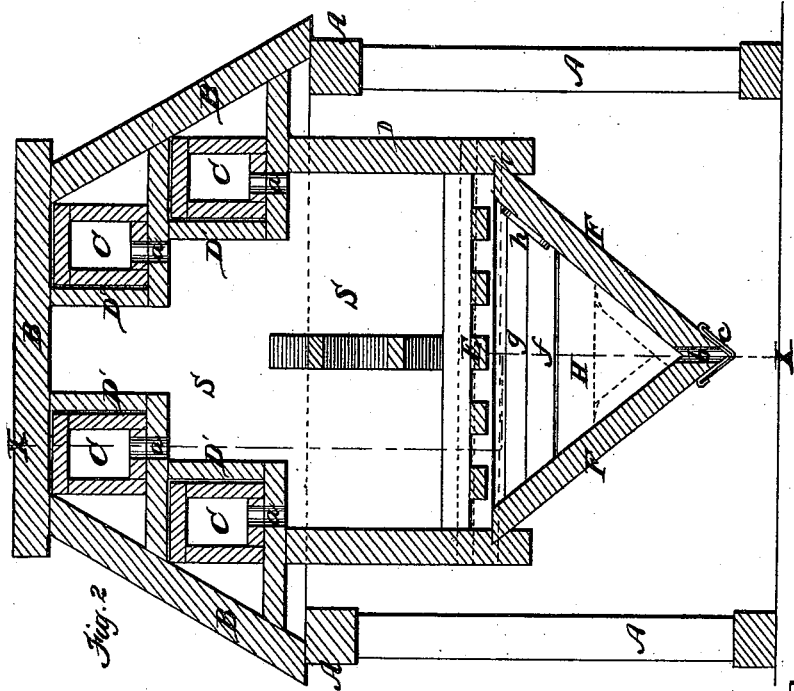
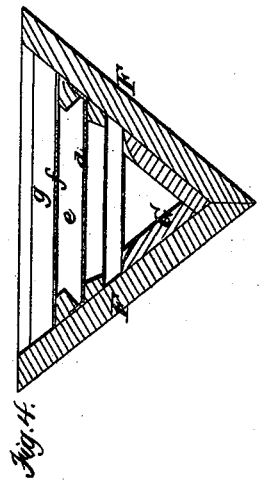
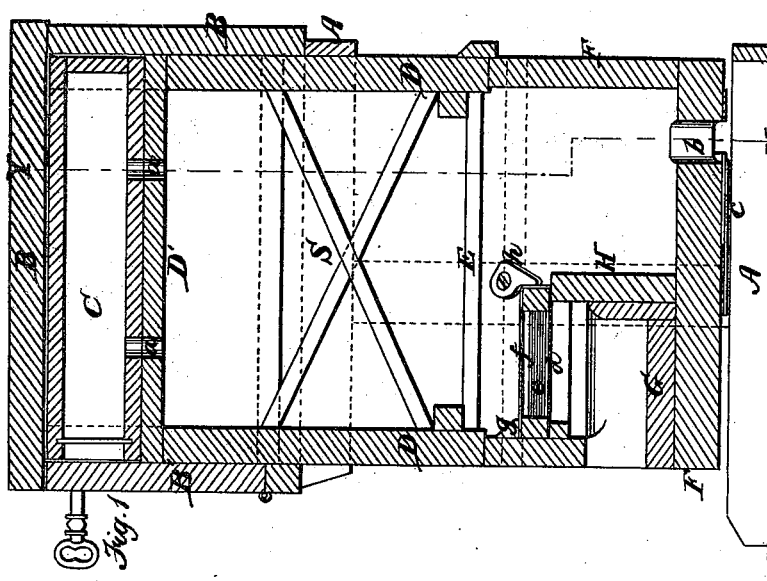
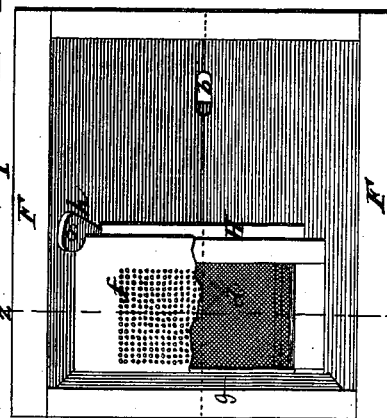
Witnesses
R. T. Campbell
A. Hormann
Inventor:
James H. Crandell
by
Mason, Fenwick & Lawrence

JAMES H. CRANDELL, OF UPPER MARLBOROUGH, MARYLAND.

Letters Patent No. 89,129, dated April 20, 1869.

IMPROVEMENT IN BEE-HIVES.

The Schedule referred to in these Letters Patent and making part of the same.

*To all whom it may concern:*

Be it known that I, JAMES H. CRANDELL, of Upper Marlborough, in the county of Prince George's, and State of Maryland, have invented a new and useful Improvement in Bee-Hives; and I do hereby declare that the following is a full, clear, and exact description thereof, reference being had to the accompanying drawings, making a part of this specification, in which—

Figure 1 is a longitudinal section, taken vertically through a bee-hive, as indicated by the course of red line $xx$, in fig. 2, having my improvement applied to it.

Figure 2 is a transverse section, taken vertically through the hive, as indicated by the course of red line $yy$, fig. 1.

Figure 3 is a top view of the removable bottom of the hive, showing the trap in the same.

Figure 4 is a section through fig. 3, taken in the vertical plane indicated by line $zz$.

Similar letters of reference indicate corresponding parts in the several figures.

The object of this invention is to provide a bee-hive with a trap or receptacle for the miller-moth, which receptacle shall be so constructed and arranged that, while it will afford greater attraction or inducements for the miller-moth, and other insects destructive to bees, to enter it than is afforded by the regular entrance and exit for the working-bees, it will prevent such insects from obtaining access to the working-apartments of the hive, or doing injury to the bees or honey in the hive.

I have found by experiments that insects which are destructive to bees, particularly the miller-moth, will not often enter a hive through the holes made for the entrance and exit of the bees, if they can find other and larger passages.

Taking advantage of this fact, I provide a hive with an opening of such capacity as will freely admit the passage through it of the miller-moth, which opening leads into a chamber within the hive that is partly enclosed by wire cloth, or perforated sheet metal.

This perforated metal will allow a free ventilation and escape of the scent of the honey, which will attract the moth, and other insects, and at the same time it will prevent insects from obtaining access to the honey, or to the apartments in which the bees store honey, as will be hereinafter described.

To enable others skilled in the art to understand my invention, I will describe its construction and operation.

In the accompanying drawings, I have represented a well-known form of bee-hive, having my invention applied to it.

The upper portion of this hive is adapted for receiving the removable honey-boxes C C, in which the honey for domestic and other use is collected.

The lower portion S is adapted for receiving the honey for the use of the bees during the winter; and the removable V-shaped portion at the bottom of the apartment S is designed for the entrance of the bees, and for receiving in one end of it the trap for the miller-moth.

The upper cells or apartments of the hive are formed by outer walls B and a door, B', and inner walls D'; and the lower apartment S is formed by vertical side-walls D D, two of which are grooved near their lower ends to receive the upper ends of the angular bottom F, as shown in fig. 2.

E represent slats across the bottom of chamber S.

A is a frame for supporting the hive, and $b$ is the entrance and exit-hole for the working-bees, which hole is made through the bottom angle of the portion F, near one end thereof, and is provided with a perforated slide, $c$, for closing it when necessary.

The holes $a\ a$ lead from the chamber S into the honey-boxes C, and allow the bees to enter therein.

In the angular bottom portion F is a vertical partition, H, which serves, in conjunction with a horizontal screen, or perforated wall, $d$, to form a chamber at one side of the bee-entrance $b$, within which is a removable drawer, G, shown in figs. 1 and 4.

Above the screen $d$ is another screen, or perforated wall, $f$, which is applied so as to leave between it and screen $d$ a chamber, $e$.

The wall $f$ is removable, and has one of its edges turned down at a right angle, and when in place it is held by a ledge, $g$, and a button, $h$.

The opening leading into the chamber enclosed by walls H $d$ is through the end of the angular bottom F, furthest from the hole $b$, and this opening may be made as large as the said chamber will admit.

The drawer G is for the purpose of readily removing worms as they are hatched, and the chamber $e$ is for the purpose of preventing worms from getting into the apartment S, should any of the eggs be pushed through the screen $d$ into the chamber $e$.

It will be seen that my moth-trap is so applied within the angular lower section that a free space for the entrance of the bees at the bottom of said section is afforded, such space also giving a good chance for ventilation, and also allowing filth from the bee-chambers to fall down and escape through the bee-entrance.

I am aware that hives have been heretofore provided with what are termed moth-traps arranged outside of them; and therefore I do not desire to be understood as laying claim broadly to moth-traps applied to bee-hives.

The moth-chamber which I have described is arranged within the body of the hive in such manner that it is more attractive to the miller-moth than the entrance and exit-passage for the bees; at the same time the moth cannot obtain from such chamber access to the honey.

Nor do I claim broadly the arranging of a moth-trap within the lower section of a hive, as contrivances of this nature have been thus arranged in said section; but What I do claim as my invention, and desire to secure by Letters Patent, is—

1. The moth-trap screen $d$, arranged upon a partition, H, in relation to the bee-entrance $b$, and to the moth-entrance, substantially in the manner and for the purpose described.

2. The partition H, when arranged in the angular lower section of the hive, substantially as and for the purpose described.

3. The double-screened moth-trap $d\ f$, made of less width than the bee-chamber of the hive and applied and confined in its place, substantially in the manner described.

4. The combination of the angular section F, partition H, drawer G, moth-trap screen $f$, and honey-section S, substantially in the manner shown and described.

5. The removable screen $f$, confined in place by cleat $g$ and fastening $h$, substantially as described.

JAMES H. CRANDELL.

Witnesses:
A. HOWELL,
T. P. CATOR.